July 26, 1955   W. A. SHERBROOKE   2,713,982
SPRING HANGER
Filed June 22, 1951   2 Sheets-Sheet 1
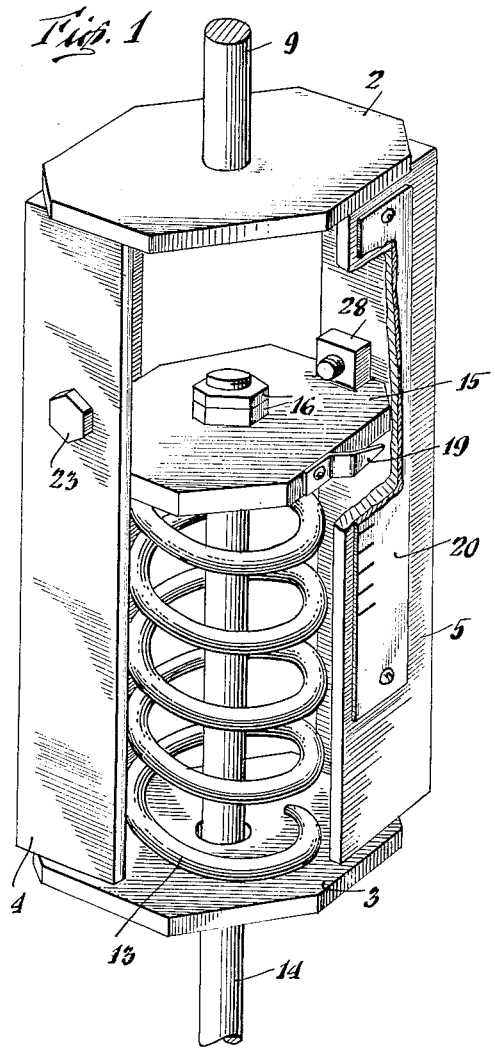
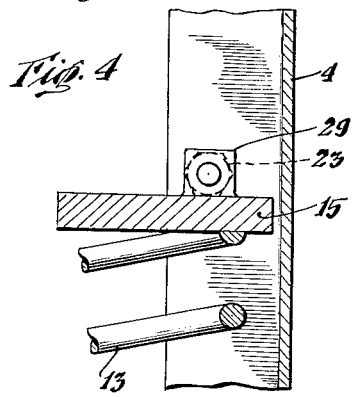
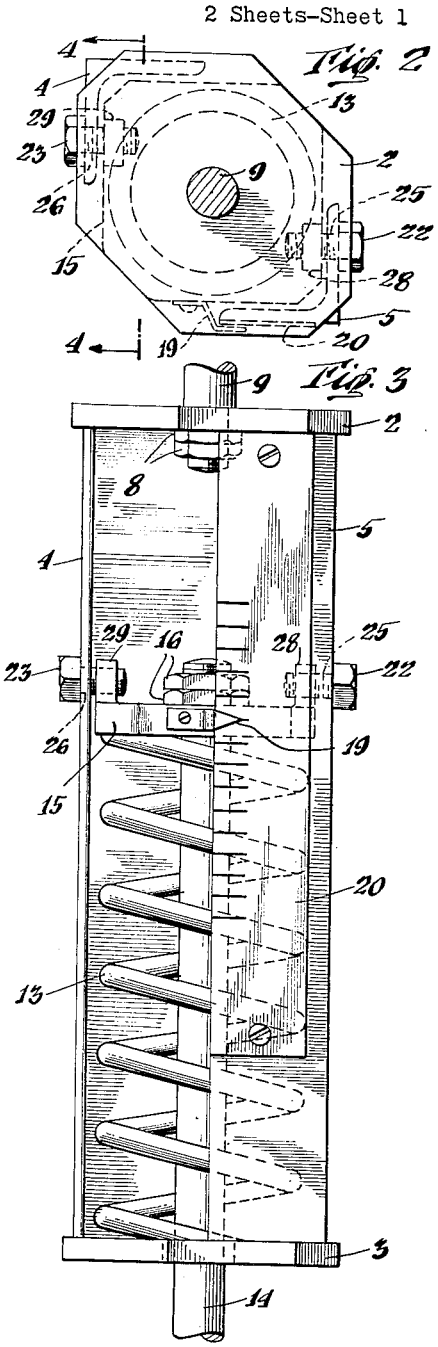
INVENTOR.
Walter A. Sherbrooke
BY
Dudley W. King
ATTORNEY July 26, 1955   W. A. SHERBROOKE   2,713,982
SPRING HANGER
Filed June 22, 1951   2 Sheets-Sheet 2
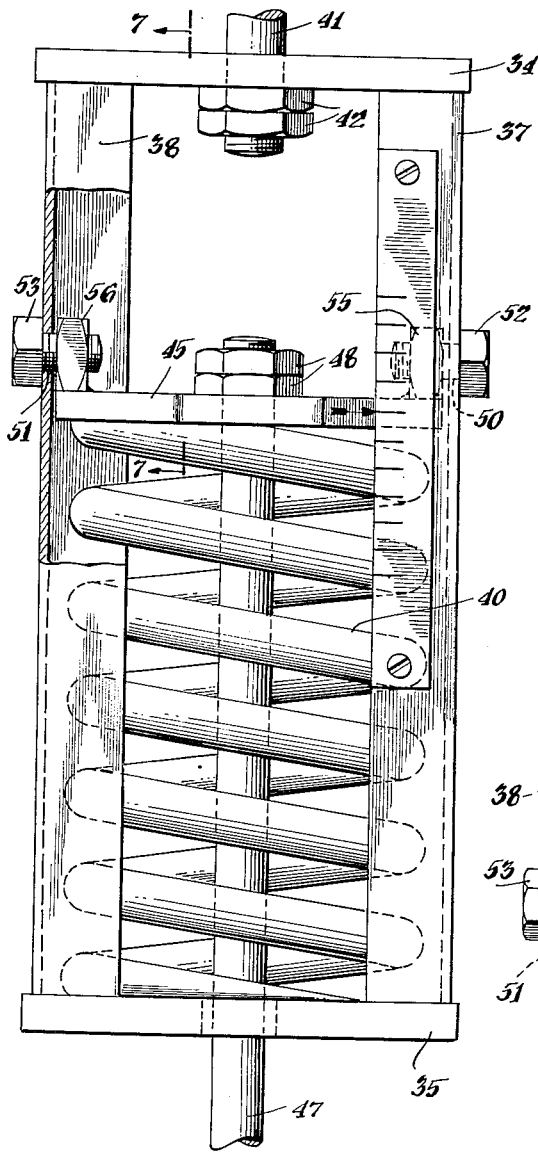
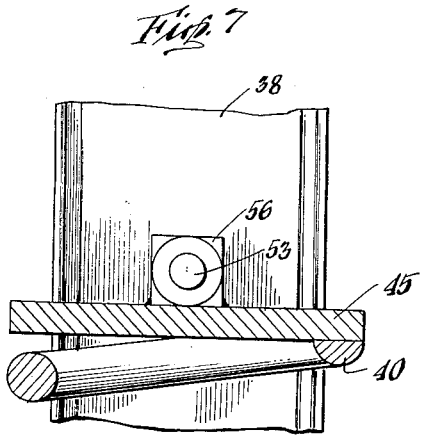
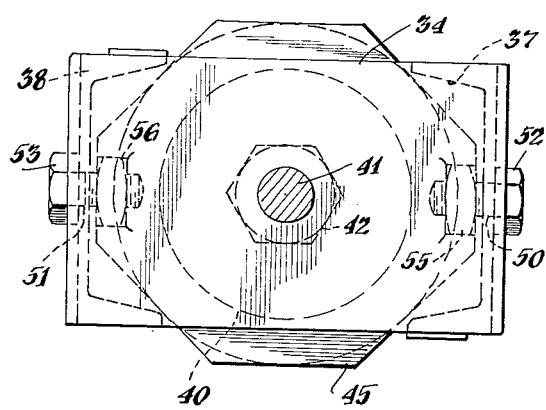
INVENTOR.
Walter A. Sherbrooke
BY
Dudley W. King
ATTORNEY

United States Patent Office 2,713,982
Patented July 26, 1955

2,713,982

SPRING HANGER

Walter A. Sherbrooke, Great Kills, N. Y., assignor to Piping Specialties, Inc., New York, N. Y., a corporation of New York Application June 22, 1951, Serial No. 233,013

7 Claims. (Cl. 248—54)

The present invention relates to a hanger for movably supporting piping in power plants or the like, and more particularly to a spring hanger which embodies relatively simple and inexpensive means adapted to maintain movable parts of the hanger in fixed position during installation of hangers and piping.

Spring type hangers generally comprise one or more fixed end plate members and an intermediate spring, the spring serving to yieldably support a movable plate member to which is connected the load that is to be carried. Several such hangers may be located at intervals along a horizontal run of pipe, the number of hangers and their spring sizes depending generally upon the weight of the pipe and the amount of its movement between hot and cold positions. When vertical lengths of pipe, known as "risers," connected with the horizontal runs are at room temperature, they have a certain length and the horizontal run has a "cold" position. As the risers are heated, they expand in length and tend to move the horizontal run to a different position. The spring hangers which carry the horizontal run of pipe allow the latter to shift and yet continue to support it. In each extreme hot or cold position, as well as at intermediate positions, the springs of the hangers move along with and tend to support the pipe load so as to minimize or eliminate objectionable strains at places such as junctures with the risers, which might otherwise cause the horizontal runs to tear loose from the risers or other connections, with consequent disastrous results.

In order to facilitate installation and to minimize or avoid excessive overloading of hanger springs during installation of the hangers and piping, it is desirable that the spring be compressed and the normally movable plate member of each hanger be temporarily fixed against movement in either direction away from its "cold" position. If the movable plate is not so held, the spring of one or more hangers may for a time be greatly overloaded as the latter may have thrown onto them a much greater load than that which they are designed to carry in normal operation, wherein the load may be appropriately distributed between several hangers located at intervals along the piping. In addition, fixedly positioning the movable plate facilitates installation of the hangers as it eliminates the need for workmen to force the plates along the hangers in opposition to the springs in order to align appropriate parts of the hangers with the piping; this results in considerable savings of time and labor.

The present invention aims to overcome difficulties such as the above by providing new and improved means of relatively simple and inexpensive construction and operation for fixedly retaining the normally movable plates of spring hangers during installation of the hangers.

An object of the present invention is to provide a new and improved spring hanger.

Another object of the invention is to provide a spring hanger which embodies means for maintaining a normally movable hanger portion in fixed position.

Another object of the invention is to provide relatively simple and inexpensive means for temporarily maintaining in fixed position a movable part of a spring hanger.

A still further object of the invention is to provide means adapted to temporarily retain in fixed position the movable plate of a spring hanger, which means may be readily incorporated into existing types of spring hangers.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view, partly broken away, showing one form of the present invention;

Fig. 2 is a top plan view of the hanger shown in Fig. 1;

Fig. 3 is a side elevational view of the hanger shown in Figs. 1 and 2;

Fig. 4 is a fragmentary sectional view taken along line 4—4 of Fig. 2;

Fig. 5 is a side elevational view of a modified form of the invention shown in Figs. 1–4;

Fig. 6 is a top plan view of the hanger shown in Fig. 5; and

Fig. 7 is a fragmentary sectional view taken along line 7—7 of Fig. 5.

Referring more particularly to the form of the invention disclosed in Figs. 1–4, there is shown a spring hanger of the compression type comprising top and bottom plates 2 and 3 connected together by spaced angle members 4 and 5, welded adjacent end portions thereof to the top and bottom plates. The top plate may have connected therewith, by nuts 8 or welding, a hanger rod 9. The hanger rod 9 may extend upwardly and be connected in suitable manner with an overhead beam or the like. The pipe or other load to be supported (not shown) is carried by the spring 13 through the intermediation of the connecting rod 14 and movable plate member 15, the latter being connected by nuts 16 or otherwise to an upper portion of the rod 14. The spring hanger may be used in any other position, for example inverted from that disclosed or mounted for movement in a horizontal direction. When a pipe or other load attached to the connecting rod 14 moves up or down, the rod moves through an aperture in the bottom plate. While round rods or flat metal plates may be used in lieu of the spaced angle members 4 and 5, the latter are convenient to fabricate into the hanger, are readily available, relatively inexpensive and also quite strong.

In normal operation the connecting rod 14 and the movable plate 15 are free to move up or down as a run of pipe moves due to changes in the length of risers connected therewith. The spring 13 expands along behind the movable plate during upward movement with the connecting rod or pipe and may be compressed during downward movement of the plate 15 and connecting rod. The amount of movement may be indicated by the usual pointer 19 on the movable plate, which travels along a fixed scale 20.

While the above referred to freedom of movement of the intermediate plate 15 and flexing of the spring are necessary under normal conditions when supporting the pipe in a plant, it is objectionable during installation of hangers. Means is therefore shown in Figs. 1–4 for holding the intermediate plate 15 in a "cold" or installation position, in which the spring is partially compressed. This means comprises pins or bolts 22 and 23 that extend through apertures 25 and 26 in the angle members and into apertured members or nuts 28 and 29 shown welded to oppositely disposed portions of the intermediate plate 15. The apertures in the angle members have dimensions about equal to those in the nuts 28 and 29, so that when a pin or bolt with a dimension about equal to that of the apertures extends into both of them, it abuts against the surfaces which form the apertures and holds the intermediate plate 15 against movement up or down.

Preferably the nuts, apertures and interlocking pins are provided at opposite portions of the intermediate plate, as this tends to hold the plate even. The apertures in the nuts or members 28 and 29 need not extend entirely therethrough, but could be blind holes into which the bolts 22, 23 extend.

The apertured members 28 and 29 on the intermediate plate are preferably threaded so that a thread on the bolt 22 may engage therewith and be retained against unintentional removal. The bolts or pins 22, 23 could, however, be retained in position in any other suitable manner, for example by cotter pins inserted through appropriate holes in the bolts.

While the apertured members or nuts 28, 29 are shown welded to the upper surface of the intermediate plate 15, they could be welded into slots formed at the periphery of the intermediate plate. If desired, apertures could be formed directly into the intermediate plate 15 for receiving the inner ends of the bolts 22 and 23. Welding nuts onto the plate member 15 for receiving the bolts has the advantage of utilizing commercially available materials and does not require cutting or drilling the movable plate.

In the relationship shown in Figs. 1–4, the intermediate plate 15 is held against movement away from a "cold" position, in which the partially compressed spring would normally carry a "cold" load. When the bolts extend through the nuts, as shown in Figs. 1–4, the entire device acts as a rigid hanger and may be so installed. The hanger rod 9 may be connected with some overhead structure and adjusted to about correct height; thereafter a length of pipe may be readily secured to the connecting rod 14 by some suitable clamp. Frequently several hangers are provided at intervals along the pipe to support it, and during installation some hangers may be required to temporarily support a much greater weight of pipe than when the weight is appropriately distributed between all the hangers. In such event the springs of the hangers embodying the present invention cannot become excessively compressed and possibly permanently "set," due to the fact that the retaining nuts and bolts through the connecting angle members rigidly support any load and prevent it from being thrown onto the springs 13.

In Figs. 5, 6 and 7, the present invention is shown embodied in a hanger having its top and bottom plates 34, 35 connected together by oppositely spaced channel members 37 and 38. The channel members extend along opposite sides of the protruding spring 40 and may be welded to the top and bottom plates. The top plate 34 may be supported by a hanger rod 41 connected therewith by nuts 42. The protruding intermediate movable member 45 rests against the upper end of the spring 40 and is joined with the connecting rod 47 by nuts 48.

Each of the spaced channel members 37 and 38 is provided with apertures 50 and 51 therethrough for receiving bolts 52 and 53 which extend into nuts 55 and 56 welded to the intermediate plate 45. The dimensions of the apertures through the channel members 37 and 38 are preferably only slightly greater than the cross sectional dimension of the bolts so that when the latter extend through the apertures and into the nuts 55 and 56, the intermediate plate 45 is fixedly maintained in position against movement in any direction. While the apertures 50 and 51 in the channel members 37 and 38 are shown along a center line of the hanger, they could be offset therefrom or elevated above the nuts 48 to permit inserting a single bar straight through the apertures of the channel members and both nuts 55 and 56. Here again, when the intermediate plate 45 is fixedly positioned by the bolts, the partially compressed spring 40 is held against movement and the hanger may be installed as a rigid hanger.

After installation of the hangers disclosed herein and after the pipes have been supported thereon, the retaining bolts 22, 23 of Figs. 1–4 or 52, 53 of Figs. 5–7 may be removed. The "cold" load on the respective connecting rods 14 or 47 will at this time be appropriately distributed between the various hangers so that their springs support the piping in its designed "cold" position. As the piping is heated, it may move and the springs of the hangers follow up and support it in the usual manner.

While the invention has been disclosed herein as embodied in hangers of the exposed spring type, which are frequently preferred due to the fact that the springs and other interior parts of the hanger may be readily inspected, it will be clear that the retaining means may be used with hangers of the enclosed type in which the spring is surrounded by an outer casing.

It will be seen that the present invention provides new and improved means for fixedly retaining in position the normally movable intermediate plate of a spring hanger, so that the hanger may be installed as conveniently as a rigid hanger. The present retaining means is of simple and sturdy construction and greatly facilitates installation of the hangers. It may be built into hangers during their manufacture or may be incorporated into previously constructed hangers with relatively little trouble and expense. The device is of rugged construction and is well adapted to stand up under any conditions of shipment or rough usage to which it may be subjected. When the retaining pins are withdrawn, the hanger is free to operate in normal manner with the spring supporting the intermediate movable plate at hot, cold or other intermediate position of the piping.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A pipe hanger having a pair of fixed spaced end plates and an intermediate movable member, a supporting spring disposed for compression between one of said end plates and said movable member, a connecting member joining said end plates together and extending along the path of movement of said movable member and engaging a portion of the movable member to prevent rotation thereof relative to said connecting member, and removable means for operatively interconnecting said members and holding the movable member against movement to and fro along said connecting member.

2. A pipe hanger having a fixed end plate, a movable member spaced from said fixed end plate and having an aperture, a spring disposed for compression between said plate and movable member, and a member rigidly connected with said end plate and extending along the path of movement of said movable member and having angularly disposed portions engaging and guiding said movable member and preventing relative rotation of said members and having an aperture in one of said portions registrable with the aperture of the movable member for receiving a locking pin to fixedly position the movable member.

3. A pipe hanger having a fixed end plate, a movable plate, a spring disposed for compression between said plates, a member rigidly connected with said fixed end plate and extending along the path of movement of said movable plate having an aperture therein and engaging the movable plate for preventing rotation thereof relative to said end plate, apertured means carried by said movable plate at a location adjacent said member having its aperture registrable with said member aperture, and a pin having cross sectional dimensions corresponding generally to the cross sectional dimensions of said apertures extending into said apertures for holding said movable plate against movement in any direction along said path of movement.

4. In a pipe hanger having a pair of spaced end plates and a spring positioned with one end bearing against one of said plates, a member connected with said end plates maintaining them in spaced relationship and having an aperture therethrough, an intermediate plate bearing against the other end of said spring and compressing it, a nut secured to said intermediate plate at a location adjacent said member having an aperture registering with the aperture of said member, and a bolt projecting through the aperture in said member and threaded into said nut for holding said intermediate plate against movement toward either of said end plates and being removable to free said intermediate plate for movement toward one or the other of said end plates on compression or expansion of said spring.

5. A device as claimed in claim 4, in which an additional member is connected with the end plates at a location peripherally spaced from said first named member, said additional member is provided with an aperture, an additional nut is secured to said intermediate plate and has an aperture registered with the aperture in said additional member, and an additional bolt extends through said additional aperture into the additional nut.

6. A pipe hanger having a fixed end plate, a movable member having flat edge portions, a spring disposed for compression between said plate and member, a plurality of stationary members secured to said end plate at peripherally spaced locations having angularly disposed flanges engaging the flat edge portions of said movable member and preventing rotation of the movable member relative to said plate, the movable member and said flanges having apertures therein adapted to register at a predetermined spacing of the movable member from the fixed end plate producing predetermined compression of said spring, and means adapted to extend into said registering apertures and lock the movable member against movement back and forth along said stationary members.

7. A device as claimed in claim 6, in which a pair of apertures is provided in the movable member and an aperture is provided in a flange of each of two stationary members.

References Cited in the file of this patent

UNITED STATES PATENTS

| | | |
|---|---|---|
| 617,500 | Ehling | Jan. 10, 1899 |
| 1,004,137 | Benjamin | Sept. 26, 1911 |
| 1,221,705 | Duke | Apr. 3, 1917 |
| 1,370,862 | Vasger | Mar. 8, 1921 |
| 1,730,618 | Mayo | Oct. 8, 1929 |
| 1,867,233 | Roos | July 19, 1932 |
| 1,915,727 | Friedemann | June 27, 1933 |
| 2,159,870 | Wert | May 23, 1939 |
| 2,397,094 | Donkersley | Mar. 26, 1946 |
| 2,570,538 | Fincher | Oct. 9, 1951 |